US005874456A

United States Patent [19]

McDade

[11] Patent Number: 5,874,456

[45] Date of Patent: Feb. 23, 1999

[54] FUNGICIDAL COMPOSITIONS

[75] Inventor: Mark Daniel McDade, Boulder, Colo.

[73] Assignee: Novartis AG, Basel, Switzerland

[21] Appl. No.: 446,097

[22] Filed: May 19, 1995

Related U.S. Application Data

[63] Continuation of Ser. No. 012,550, Feb. 2, 1993, abandoned.

[30] Foreign Application Priority Data

Feb. 5, 1992 [GB] United Kingdom .................... 9202378

[51] Int. Cl.[6] ....................................................... A01N 43/64

[52] U.S. Cl. ............................................................... 514/383

[58] Field of Search ............................................... 514/383

[56] References Cited

U.S. PATENT DOCUMENTS

| | | | |
|---|---|---|---|
| 4,542,146 | 9/1985 | Gestel et al. | 514/383 |
| 4,664,696 | 5/1987 | Schaub | 514/184 |
| 5,223,524 | 6/1993 | Valeke | 514/383 |

FOREIGN PATENT DOCUMENTS

| | | |
|---|---|---|
| A-0 148 526 | 12/1984 | European Pat. Off. . |
| A-0 287 346 | 4/1988 | European Pat. Off. . |

OTHER PUBLICATIONS

Barnauon et al, C.A. vol. 109, 1988, 109:165,715 u.

*Primary Examiner*—Allen J. Robinson
*Attorney, Agent, or Firm*—Michael P. Morris; Melvyn M. Kassenoff

[57] ABSTRACT

Wood preserving composition comprising a compound of formula I

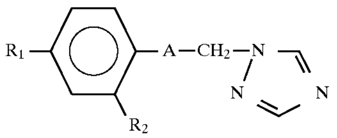

wherein

A is selected from

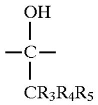

(i)

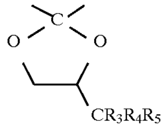

(ii)

and

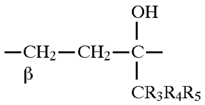

(iii)

whereby the β-carbon attaches to benzene ring of formula (I);

$R_1$ and $R_2$ are independently H or Cl;

$R_3$ and $R_4$ are independently R or $CH_3$; and $R_5$ is methyl, ethyl or cyclopropyl and method for preserving wood with the aid of a compound of formula (I).

3 Claims, No Drawings

FUNGICIDAL COMPOSITIONS

This application is a continuation of application Ser. No. 08/012,550 filed Feb. 2, 1993 now abandoned.

This invention relates to a wood preservative composition and, more specifically, to a wood preservative composition containing a triazole fungicide as active ingredient.

Wood is an important resource material in the construction and industries. Wood can, however, be susceptible to mold, decay and discoloring due to fungal attack. Various compositions are known for combatting such fungal attacks, including certain triazole compounds such as those disclosed in European Patent Application 0 131 684.

It has now been found that certain triazole compounds of the formula (I)

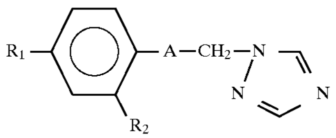

wherein

A is selected from

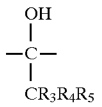
(i)

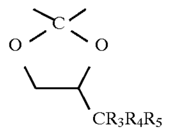
(ii)

and

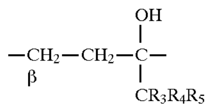
(iii)

whereby the β-carbon attaches to benzene ring of formula (I);

$R_1$ and $R_2$ are independently E or Cl;

$R_3$ and $R_4$ are independently H or $CH_3$; and $R_5$ is methyl, ethyl or cyclopropyl are particularly effective at combatting various fungi which are known to cause mold, decay and discoloration of wood.

Wood, as used herein, refers to any type of wood material or wood product such as plywood, pressed wood, particleboard, wood chip, pulp or intermediates obtained in papermaking.

Particularly preferred compounds of the formula (I) are those in which $R_1$ is Cl, $R_2$ and $R_3$ are H, $R_4$ is $CE_3$ and $R_5$ is cyclopropyl and A is the moiety (i) (commonly known as cyproconazole); those in which $R_1$ is Cl, $R_2$ is H, $R_3$, $R_4$ and $R_5$ are $CE_3$ and A is the moiety (iii) (commonly known as tebuconazole); and those in which $R_1$ and $R_2$ are Cl, $R_3$ and $R_4$ are H, $R_5$ is ethyl and A is the moiety (ii) (commonly known as propiconazole).

The specific compounds mentioned in the preceding paragraph are commercially available. Other compounds falling under the scope of formula (I) are obtainable according to procedures analogous to those known for preparing the commercially available compounds.

The compounds of formula (I) for use as wood preservatives are conveniently formulated into compositions comprising a wood preserving or fungicidally effective amount of the compound of formula (I) and an environmentally acceptable carrier for such usage.

The term carrier as used herein means any environmentally acceptable liquid or solid material which may be added to the active constituent to bring it in an easier or improved applicable form, respectively to a usable or desirable strength of activity. It can for example be calcium, magnesium carbonate, xylene or water.

The compositions may also be in the form of dispersible powders or granules and will conveniently comprise a surfactant, e.g. a wetting or dispersing agent to facilitate dispersion in liquids of the powder or granules which may contain also fillers and suspending agents.

The aqueous dispersions or emulsions may be prepared by dissolving the active ingredient in an organic solvent optionally containing wetting, dispersing or emulsifying agents and then adding the mixture to water which may also contain one or more surfactants, such as wetting, dispersing or emulsifying agents. Suitable organic solvents are ethylene dichloride, isopropyl alcohol, propylene glycol, diacetone alcohol, toluene, kerosene, methylnaphthalene, polyethyleneglycol, N-methyl-2-pyrrolidone, mixtures of C9 to C11 fatty alcohols, the xylenes, trichloroethylene, furfuryl alcohol, tetrahydrofurfuryl alcohol and glycol ethers.

Typically, the compositions will be in the form of liquid preparations for use as dips or sprays which are generally aqueous dispersions or emulsions containing the active ingredient in the presence of one or more surfactants e.g. wetting agents, dispersing agents or emulsifying agents. The surfactants may be cationic, anionic or non-anionic, all of which are known in the art.

Suitable anionic agents are soaps, salts of aliphatic monoesters of sulphuric acid and salts of sulphonated aromatic compounds.

Suitable non-ionic agents are the condensation products of ethylene oxide with fatty alcohols or with alkyl phenols. Other non-ionic agents are the partial esters derived from long chain fatty acids and hexitol anhydrides, the condensation products of partial esters with ethylene oxide and the lecithins.

The compositions of the invention may contain further adjuvants including thickening agents, antifoam agents, antifreeze agents and suspending agents.

Suitable suspending agents are hydrophilic colloids and vegetable gums.

The compositions for use as aqueous dispersions or emulsions are generally supplied in the form of a concentrate containing a high proportion of the active ingredient, the concentrate to be diluted with water before use. The concentrates may conveniently contain up to 95%, suitably 10–85%, for example 25–60% by weight of the active ingredient. After dilution to form aqueous preparations, such preparations may contain varying amounts of the active ingredient depending upon the type of wood to be treated and the type of fungus, but typically the aqueous preparation will contain from 0.0001% to 10% by weight active ingredient, more typically from 0.001% to 1%.

Methods of applying the compounds to the wood to be treated, such as spraying, dipping, by paint brush, etc., are known to those skilled in the art. Application can be repeated, as necessary.

The formulations listed below are representative of suitable formulations for use in the invention, and are admixed and agitated in accordance with conventional methods to obtain a wood preservative composition.

Formulation 1

400 g/l cyproconazole 55 g/l nonionic polymeric emulsifier blend (e.g. polyalkylene glycol ether/polyoxyethylene alkylaryl ether blend)

66 g/l antifreeze (e.g. 1,2 propanediol)

3 g/l thickening agent (e.g. xanthane gum)

1 g/l bactericide 4 g/l antifoam agent (e.g. silicon) balance water

Formulation 2

100 g/l cyproconazole 57 g/l emulsifier (e.g. a nonylphenolethoxyphosphate)

96 g/l solvent (e.g. N-methyl-2-pyrrolidone) balance solvent (e.g. polyethyleneglycol)

Formulation 3 (emulsifiable concentrate)

100 g/l cyproconazole 74 g/l emulsifier (e.g. nonylphenyl-hydroxypoly (oxyethylene)phosphate)

92 g/l emulsifier (e.g. alkyl hydroxypoly(oxyethylene) phosphate)

46 g/l solvent (e.g. hexanol) 101 g/l solvent (e.g. N-methyl-2-pyrrolidone) balance solvent (e.g. mixture of C9 to C11 fatty alcohols)

Formulation 4 (wettable granule)

10% cyproconazole

15% dispersing agent (e.g. sodium lignin sulfonate)

75% carrier (e.g. calcium magnesium carbonate)

Test of activity against wood destroying fungi in vitro

Suspensions containing a test compound of formula I are incorporated into potato dextrose agar (PDA) to produce a series of five concentrations containing 100 ppm, 10 ppm, 1 ppm, 0.1 ppm, 0.01 ppm resp. of active ingredients. The thus obtained agar test compositions are poured into 9-cm petri dishes. After solidification of the medium, each dish is inoculated with a mycelial disc (5 mm diameter) taken from the periphery of actively growing colonies on PDA (three replicate dishes per isolate per concentration). After incubation (24° C. in darkness, 5–14 days depending on the growth rate of the fungi), colony radii are measured. Percentage growth inhibition is calculated on the basis of treated control plates. The EC90 (effective concentration causing 90% growth inhibition) is determined on the basis of dose-response curves.

The compounds of formula (I) are effective in combatting various type of fungi including the following fungi and the symptoms to which they lead.

| Fungus class | Species | Sympton |
|---|---|---|
| *ascomycetes* | *Sydowia polyspora* | dieback/pine |
| | *ceratocysti fagacearum* | wilt/oak |
| | *ceratocysti pilifera* | blue stain |
| | *Cephaloascus fragrans* | mold |
| | *Physalospora rhodina* | discoloration |
| *basidiomycetes* | *Coriolus versicolor* | decay |
| | *Poria placenta* | decay |
| | *Lentinus lepideus* | decay |
| | *Trametes versicolor* | decay |
| | *Serpula lacrymans* | mold |
| | *Coniophora putanea* | decay |
| | *Gloeophyllum trabeum* | decay |
| *deuteromycetes* | *Aspergillus niger* | discoloration |
| | *Phialophora fastigiata* | discoloration |
| | *Alternaria alternata* | discoloration |
| | *Rhinocladiella atrovirens* | discoloration |
| | *Gliocladium roseum* | mold |
| | *Aureobasidium pullulans* | discoloration |
| | *Trichoderma viride* | decacy |
| | *Sphaeropsis sapinea* | dieback/conifers |
| | *Pencillium expansum* | mold |

Fungicidal activity

The compounds cyproconazole, propiconazole and tebuconazole when tested against a variety of fungal diseases demonstrate particularly good activity against basidiomycetes including the fungi *Coriolus versicolor, Poria placenta, Serpula lacrymans, Coniophora puteana, Gloeophyllum trabeum, Lentinus lepideus* and *Trametes versicolor.*

Cyproconazole is particularly effective against *Poria placenta, Lentinus lepideus* and *Trametes versicolor.*

What is claimed is:

1. A method for preserving wood from fungal attack comprising applying to the surface of the wood a fungicidally effective amount of cyproconazole.

2. The method according to claim 1 wherein the wood is preserved from attack by basidomycetes.

3. The method according to claim 1 wherein the wood is in the form of plywood, pressed wood, particle-board, wood chip or wood pulp.

* * * * *